United States Patent

Tsuyuguchi et al.

[11] Patent Number: 5,260,634
[45] Date of Patent: Nov. 9, 1993

[54] CONSTANT CURRENT DRIVING SYSTEM FOR A STEPPER MOTOR IN ROTATING DISK

[75] Inventors: Hiroshi Tsuyuguchi, Tokyo; Tohro Miura, Chofu; Naoki Sugeta, Fuchu; Tadashi Terada, Tanashi; Miya Enami, Higashikurume, all of Japan

[73] Assignee: TEAC Corporation, Tokyo, Japan

[21] Appl. No.: 909,617

[22] Filed: Jul. 7, 1992

[30] Foreign Application Priority Data

Jul. 11, 1991 [JP] Japan ................................. 3-197127

[51] Int. Cl.$^5$ ............................................. H02P 8/00
[52] U.S. Cl. .................................... 318/696; 388/811; 388/819; 388/915; 361/23; 361/28; 361/29
[58] Field of Search ................ 388/811, 819, 915; 361/23, 28, 29; 318/696

[56] References Cited

U.S. PATENT DOCUMENTS

| | | | |
|---|---|---|---|
| 4,677,359 | 6/1987 | Enami et al. ......................... | 318/69 |
| 4,871,952 | 10/1989 | Ishizaka et al. ................. | 388/829 X |
| 4,949,393 | 8/1990 | Ohmori et al. ................. | 388/815 X |
| 5,017,854 | 5/1991 | Gully et al. ......................... | 318/811 |

Primary Examiner—William M. Shoop, Jr.
Assistant Examiner—Karen Masih
Attorney, Agent, or Firm—Woodcock Washburn Kurtz Mackiewicz & Norris

[57] ABSTRACT

In order to drive the stepper motor of a floppy disk drive with practically constant current in the face of fluctuations in supply voltage fed from a host system, a power control pulse generator circuit is provided which produces a series of power control pulses having a duty ratio dependent upon fluctuating supply voltage. The power control pulses are used for interrupting the excitation of the stepper motor windings during track seek operation. The power control pulses are generated by first repeatedly counting clock pulses from the host system to a predetermined number to provide periodically varying digital data, then translating the digital data into a triangular wave having an amplitude dependent upon the supply voltage, and then comparing the triangular wave with a reference voltage.

12 Claims, 6 Drawing Sheets

CONSTANT CURRENT DRIVING SYSTEM FOR A STEPPER MOTOR IN ROTATING DISK

BACKGROUND OF THE INVENTION

This invention relates generally to an apparatus having a transducer or transducers for data transfer with a rotating data storage disk such as a flexible magnetic disk having a multiplicity of concentric annular record tracks on one or both of its major surfaces. More specifically, the invention pertains to a system in such rotating disk data storage apparatus for the constant current driving of a stepper motor for transporting the data transducer or transducers from track to track on the disk, in the face of possible fluctuations in supply voltage.

The flexible magnetic disk apparatus, or floppy disk drive according to common parlance, is usually not self contained; it is subservient to a host system as in such familiar electronic data processing systems as personal computers and word processors. Usually, therefore, disk drives have no power supply of their own but are powered from the host system. The power supply circuit of the host system is provided with a voltage regulating circuit such as a switching regulator. Since a number of loads are connected to the voltage regulating circuit, the supply voltage fed to each load is not necessarily constant even if the output voltage itself of the regulating circuit is constant.

One of such load is the bidirectional stepper motor which is customarily employed for transducer positioning, as disclosed for example in U.S. Pat. No. 4,677,359 to Enami et al. Conventionally, the stepper motor suffered from irregularities in supply voltage. Fluctuations in the voltage supplied to the stepper motor were particularly objectionable because the transducer or transducers would travel different distances depending upon the direction of rotation of the stepper motor in response to such fluctuating supply voltage. Excessively high drive voltages for the stepper motor were also undesirable because of much noise produced during track seek operations and of waste of energy.

It might be contemplated to provide a known voltage regulating circuit exclusively for the stepper motor. This solution is unsatisfactory as the additional voltage regulating circuit of conventional design would add substantially to the cost of the disk drive.

SUMMARY OF THE INVENTION

The present invention seeks to stably drive the stepper motor despite possible fluctuations in supply voltage and, in so doing, to make utmost use of existing parts and signals of the rotating disk data storage apparatus for the simplicity of the required circuitry.

Briefly, the invention may be summarized as a data transfer apparatus for use with a rotating data storage disk, comprising transducer positioning means including a stepper motor for positioning a transducer on the data storage disk, a plurality of switching elements connected between the stepper motor and supply means, and a stepper motor control circuit connected to the switching elements for applying thereto motor control signals in response to series of stepping pulses in order to cause controlled excitation, and hence controlled rotation, of the stepper motor from the supply means. Also included are a power control pulse generator circuit connected to the supply means for generating a series of power control pulses having a duty ratio dependent upon the fluctuating supply voltage, and circuit means connected to the power control pulse generator circuit for interrupting the controlled excitation of the stepper motor as dictated by the power control pulses.

In one preferred embodiment of the invention, the power control pulses have their durations modulated with the fluctuating supply voltage. Fluctuations in the supply voltage, which are unavoidable as aforesaid in the apparatus of this type, are compensated for as the supply voltage impressed to the stepper motor are interrupted at intervals determined by the duration modulated power control pulses. Such brief interruptions of the supply voltage will have no adverse effect upon the operation of the stepper motor, assuring the flow of practically constant currents through the stepper motor windings by virtue of their inductances.

Preferably, the pulse duration modulation control of power to the stepper motor should be resorted to only during track seek operation in order to preclude the danger of noise due to power control finding its way into the retrieved data. It is also recommended that the pulse duration modulation control of power be commenced with some delay after the beginning of each track seek operation, thereby permitting the stepper motor to be powered continuously from the supply means for a sufficiently high starting torque. Means to both of these ends will be disclosed.

The invention also features the construction of the power control pulse generator circuit itself. One preferred construction, designed to make best use of the existing parts and signals, comprises a digital counter for repeatedly counting clock pulses from an associated host system to a predetermined number in order to provide periodically varying digital data. This output data is fed into a digital to analog converter which has its supply input connected to the supply means, so that the converter produces a triangular wave having an amplitude dependent upon the fluctuating supply voltage. The desired duration modulated power control pulses are obtained through comparison of this triangular wave with a reference voltage. Utmost simplicity in circuitry is thus accomplished.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
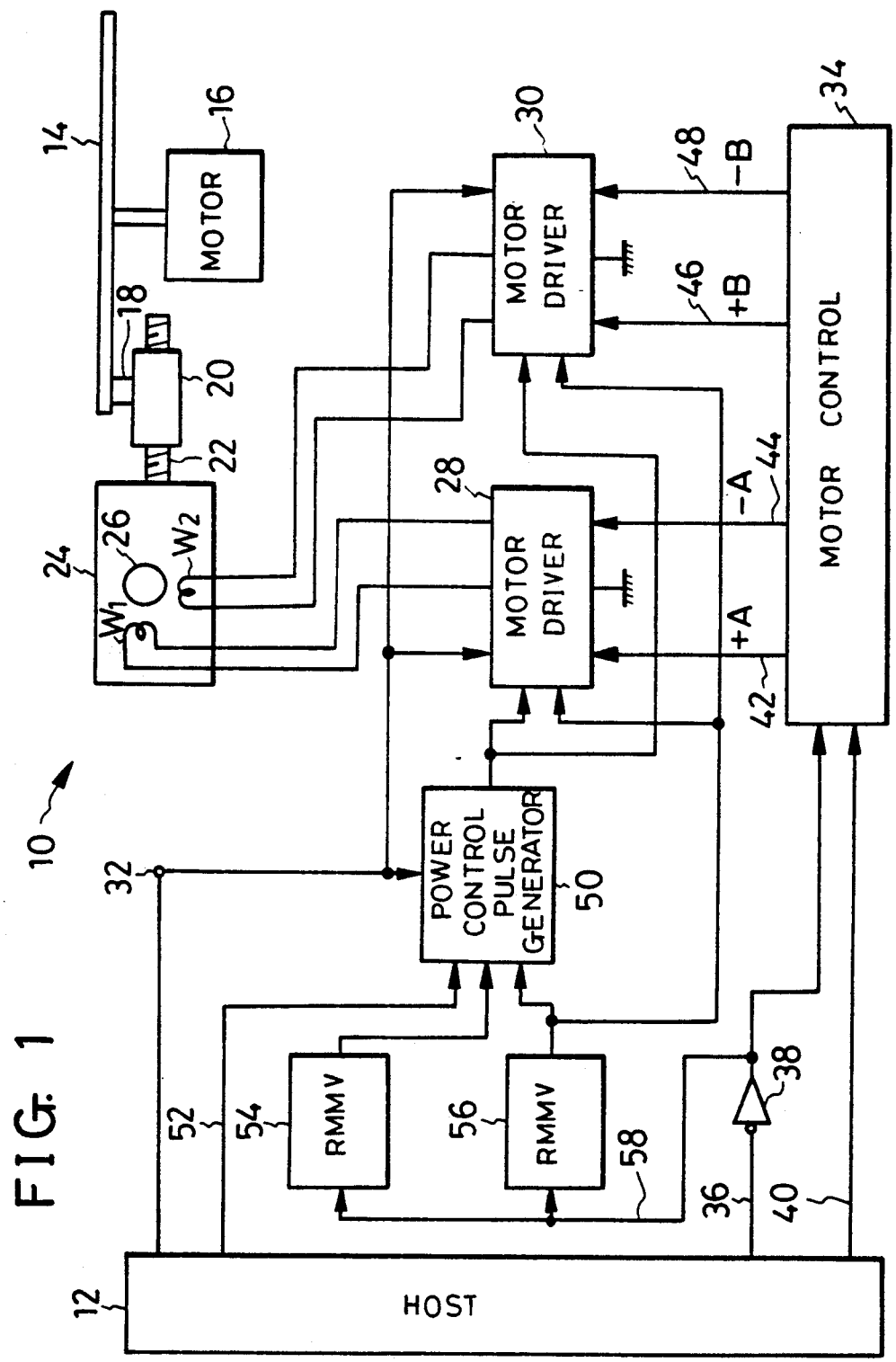
FIG. 1 is a block diagram of a flexible magnetic disk drive embodying the principles of this invention, the disk drive being shown together with a host system.

The floppy disk drive embodying the present invention is generally designated 10 in FIG. 1 and therein shown connected to a host system 12 via an interface circuit, not shown, of conventional design. The disk drive 10 is shown to have a flexible magnetic disk 14 replaceably mounted in position therein. The magnetic disk 14 is to be rotated directly by a disk drive motor 16. It is understood for the convenience of disclosure that the magnetic disk 14 is single sided, having annular record tracks arranged concentrically on only one of the major surfaces of the disk.

For writing and reading data on the single sided magnetic disk 14, a data transducer 18 is provided which travels across the tracks on the disk. The transducer 18 is shown mounted on a carriage 20 for such track accessing. The carriage 20 is constrained to travel radially of the magnetic disk 14 as a lead screw 22 is driven by a stepper motor 24. Other motion translating mechanisms could of course be employed, but the lead screw is preferred because of the large detent torque thereby offered when the stepper motor is unenergized.

The stepper motor 24 is of bipolar construction, having a set of windings $W_1$, one shown, and another set of windings $W_2$, also one shown, which are arranged alternately and which are to be selectively energized to cause a rotor 26 to rotate in two opposite directions. The two sets of motor windings $W_1$ and $W_2$ are energized respectively by a first 28 and second 30 driver circuit. These driver circuits 28 and 30 are both connected between a supply terminal 32 of the disk drive 10 and ground. The supply terminal 32 is connected in turn to a source, not shown, of unidirectional supply voltage within the host system 12, as is conventional in the art.

It is understood that the supply terminal 32 is additionally connected to other loads including the disk drive motor 16 which operates intermittently. Accordingly, the supply voltage is not necessarily of constant magnitude, heretofore giving rise to the inconveniences pointed out earlier in this specification.

The driver circuits 28 and 30 drive the stepper motor 24 under the direction of a stepper motor control circuit 34. The host system 12 is connected to the stepper motor control circuit 34 via a stepping pulse line 36 having an inverter 38 and via a stepping direction signal line 40. Thus, inputting the stepping pulses and the stepping direction signal from the host system 12, the stepper motor control circuit 34 will control the stepper motor driver circuit 26 and 30 accordingly. The stepper motor 24 will rotate through an angle determined by the number of the stepping pulses and in a direction determined by the binary state of the stepping direction signal, causing the transducer 18 to travel to a desired destination track on the disk 14.

The stepper motor control circuit 34 has two output lines 42 and 44 connected to the first driver circuit 28, and another two output lines 46 and 48 connected to the second driver circuit 30. The first output line 42 is for the delivery of a motor control signal (hereinafter referred to as the "plus A" control signal) for causing the first driver circuit 28 to energize the first set of stepper motor windings $W_1$ forwardly. The second output line 44 is for the delivery of a motor control signal ("minus A" control signal) for causing the first driver circuit 28 to energize the first set of stepper motor windings $W_1$ reversely. The third output line 46 is for the delivery of a motor control signal ("plus B" control signal) for causing the second driver circuit 30 to energize the second set of stepper motor windings $W_2$ forwardly. The fourth output line 48 is for the delivery of a motor control signal ("minus B" control signal) for causing the second driver circuit 30 to energize the second set of stepper motor windings $W_2$ reversely.

All these motor control signals are conventional, so that no more detailed discussion on this subject is deemed necessary. Nevertheless, since the motor control signals are closely related to the stepper motor drive system according to the invention, they are indicated at (D) through (F) in FIG. 2.

At 50 is shown a power control pulse generator circuit for generating duration modulated power control pulses for stabilizing the excitation currents of the stepper motor windings $W_1$ and $W_2$ in the face of possible fluctuations in supply voltage in accordance with the invention. The power control pulse generator circuit 50 has inputs connected to the supply terminal 32, a clock pulse line 52 from the host system 12, and two retriggerable monostable mulitvibrators (RMMV) 54 and 56. The RMMVs 54 and 56 have both their inputs connected to an output line 58 of the inverter 38 on the stepping pulse line 36. The generator circuit 50 has an output connected to both stepper motor driver circuits 28 and 30. The output of the RMMV 56 is also connected to both stepper motor driver signal circuits 28 and 30.

Figure 2:
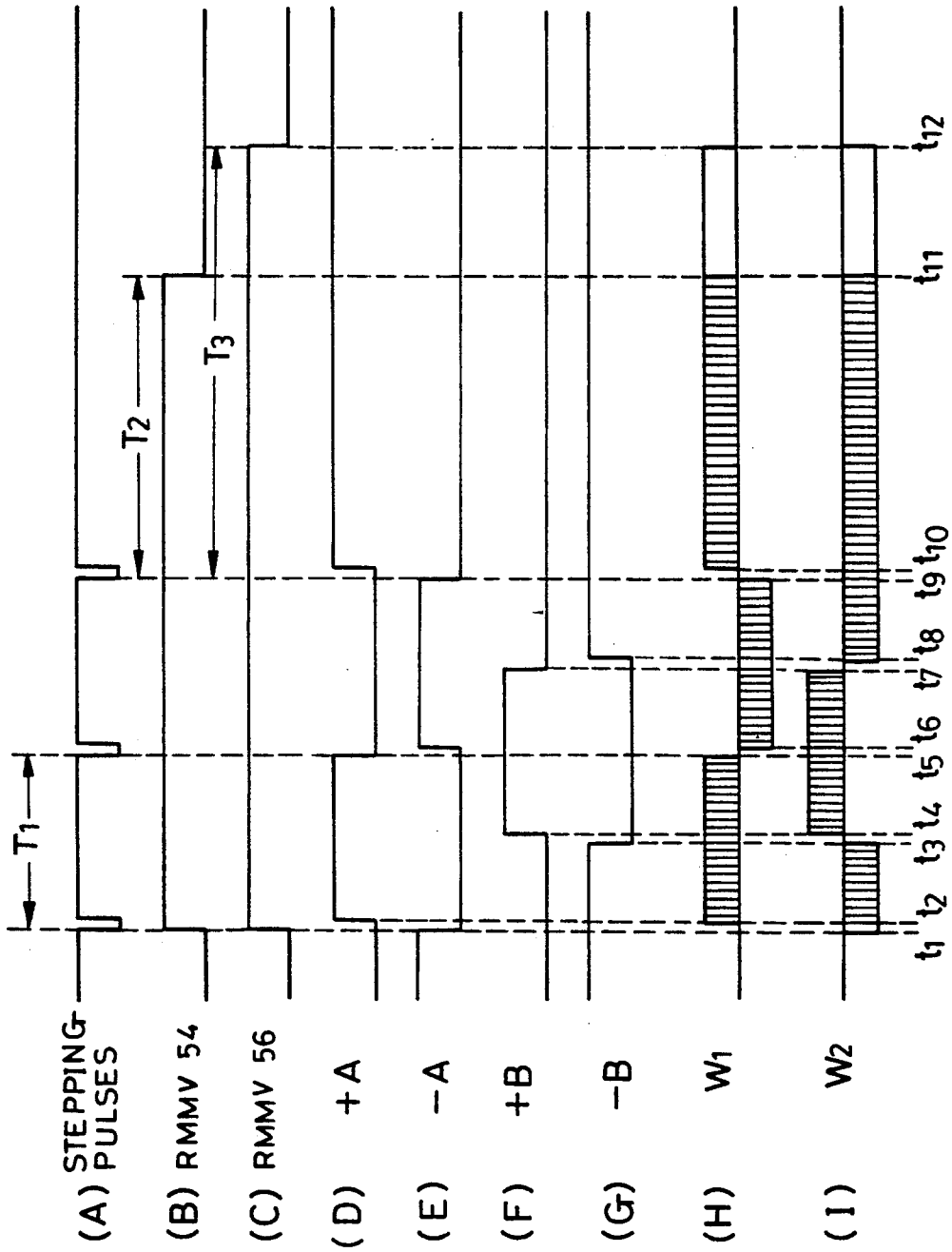
FIG. 2, consisting of (A) through (I), is a waveform diagram useful in explaining the operation of the stepper motor drive system incorporated in the disk drive of FIG. 1.

Reference may be had to FIG. 2 for the functions of the two RMMVs 54 and 56. The first RMMV 54 is triggered by the inversion of the stepping pulses, shown at (A) in FIG. 2, from the host system 12, producing an output indicated at (B) in FIG. 2. The duration $T_2$ of each intrinsic output pulse from the first RMMV 54 is longer than the period $T_1$ of the stepping pulses. Therefore, in cases where the host system 12 produces a series of stepping pulses at a stretch, the first RMMV is triggered by each such stepping pulse and goes low upon lapse of the predetermined time $T_2$ after the appearance of the last of the series of stepping pulses.

The time $T_2$ is approximately six milliseconds in this particular embodiment and agrees with the shortest time from the last of each of stepping pulse to the beginning of reading of data on the magnetic disk 14. Thus the first RMMV 54 is intended to prevent the power control pulse generator circuit 50 from controlling the driver circuits 28 and 30 during reading because the duration modulated pulse control of the driver circuits might produce noise that would find its way into the retrieved data.

The second RMMV 56, also triggered by the inversion of the stepping pulses from the host system 12, is intended to permit the stepper motor 24 to be driven only when it should be, in order to save energy. At (C) in FIG. 2 is shown the output from the second RMMV 56. The duration $T_3$ of each intrinsic output pulse from the second RMMV 56 is longer than the pulse duration $T_2$ of the first RMMV 54, being 25 milliseconds in this embodiment.

Accordingly, the stepper motor 24 becomes totally deenergized upon lapse of the time $T_3$ following the last of each series of stepping pulses. Such deenergization of the stepper motor upon completion of each track seek operation will lead to no displacement of the transducer 18 from the destination track because of the large detent torque offered by the lead screw 22 interposed between stepper motor and transducer. Of course, the second RMMV 56 might be omitted if energy saving was of little or no significance.

Figure 3:
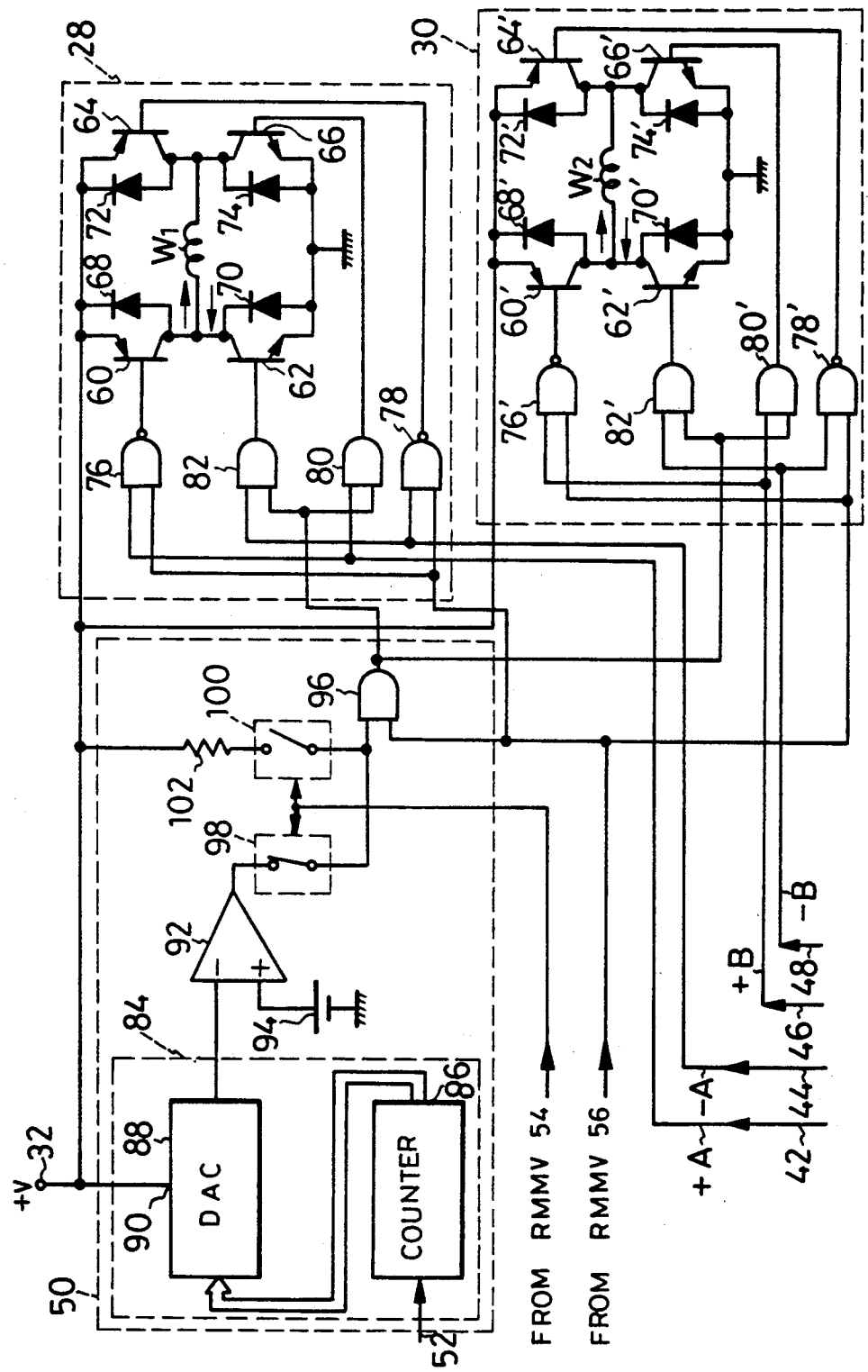
FIG. 3 is a block diagram showing in more detail the power control pulse generator circuit and the stepper motor driver circuits in the disk drive of FIG. 1.

FIG. 3 is a detailed illustration of the stepper motor driver circuits 28 and 30 and the power control pulse generator circuit 50. The two driver circuits 28 and 30 are of the same construction. Only the first driver circuit 28 will therefore be described in detail, and the component parts of the second driver circuit 30 will be identified merely by priming the reference numerals used to denote the corresponding parts of the first driver circuit.

The first stepper motor driver circuit 28 includes a bridge circuit of four power switching transistors 60, 62, 64 and 66, through which the first set of stepper motor windings $W_1$ are connected between the supply terminal 32 and the ground. More specifically, the first transistor 60 is connected between the supply terminal 32 and a first extremity of the first set of stepper motor windings $W_1$; the second transistor 62 between the first extremity of the first set of stepper motor windings and the ground; the third transistor 64 between the supply terminal and a second extremity of the first set of stepper motor windings; and the fourth transistor 66 between the second extremity of the first set of stepper motor windings and the ground.

The first 60 and third 64 transistors are of pnp construction whereas the second 62 and fourth 66 transistors are of npn construction, for the simplicity of circuitry. The four transistors 60-66 have protection diodes 68, 70, 72 and 74 connected in parallel therewith, respectively.

The first stepper motor driver circuit 28 further comprises two NAND gates 76 and 78 and two AND gates 80 and 82. The "plus A" control signal line 42, set forth above with reference to FIG. 1, is connected on one hand to the base of the first transistor 60 via the first NAND gate 76 and, on the other hand, to the base of the fourth transistor 66 via the first AND gate 80. The "minus A" control signal line 44 is connected on one hand to the base of the third transistor 64 via the second NAND gate 78 and, on the other hand, to the base of the second transistor 62 via the second AND gate 82.

It will be seen, then, that the "plus B" control signal line 46 is connected on one hand to the base of a first transistor 60' of the second stepper motor driver circuit 30 via a first NAND gate 76' and, on the other hand, to the base of a fourth transistor 66' via a first AND gate 80'. The "minus B" control signal line 48 is connected on one hand to the base of a third transistor 64' via a second NAND gate 78' and, on the other hand, to the base of a second transistor 62' via a second AND gate 82'.

As also shown in detail in FIG. 3, the power control pulse generator circuit 50 includes a triangular wave generator circuit 84 comprising a five bit digital counter 86 and an integrating digital to analog converter (DAC) 88. Coupled to the clock pulse line 52, the counter 86 counts the incoming clock pulses up to [11111] whereupon it is reset to [00000] and resumes counting. Such periodic digital output from the counter 86 is translated by the DAC 88 into an equivalent series of analog triangular pulses.

The DAC 88 has its supply input 90 coupled to the supply terminal 32, so that the triangular wave output from the DAC varies in amplitude with variations in the supply voltage. It will therefore be appreciated that no additional circuit means are required for detecting the supply voltage in order to obtain such triangular wave that varies in amplitude in step with supply voltage fluctuations. This triangular wave must be shorter in period than the stepping pulses, for reasons that will become apparent as the description proceeds.

Also included in the power control pulse generator circuit 50 is a comparator 92 having one input coupled to the DAC 88 and another input to a reference voltage source 94. The comparator 92 compares the two inputs to produce the desired duration modulated control pulses for application to the stepper motor driver circuits 28 and 30.

Figure 4:
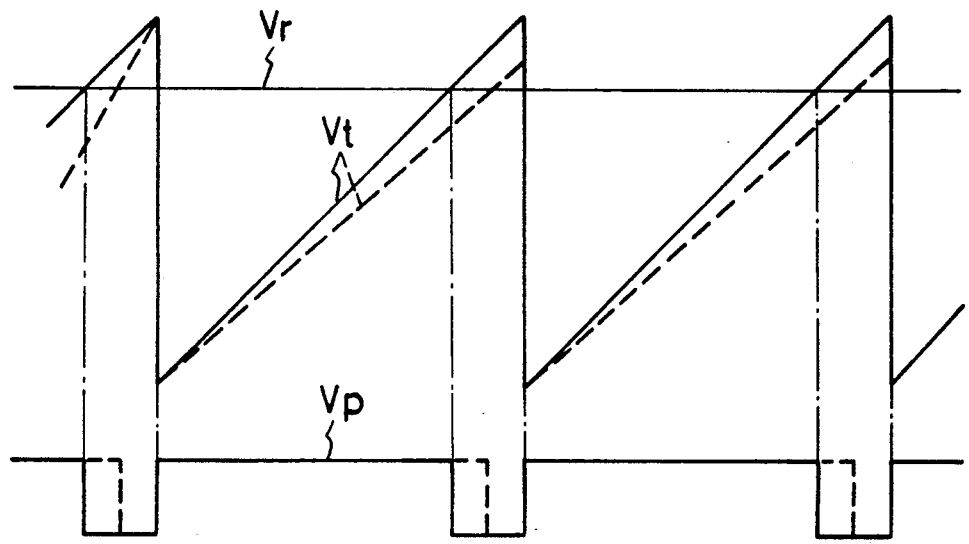
FIG. 4 is a waveform diagram explanatory of the operation of the power control pulse generator circuit.

FIG. 4 is explanatory of how the comparator 92 produces the power control pulses. The comparator inputs the triangular wave Vt from the DAC 88 and the reference voltage Vr from the source 94 and puts out the series of duration modulated power control pulses Vp. The amplitude of the triangular wave Vt decreases from the solid to the broken line upon decrease in the supply voltage, with a corresponding increase in the durations of the power control pulses Vp. Thus the power control pulses change in duty ratio depending upon the magnitude of the supply voltage.

With reference back to FIG. 3 the power control pulse generator circuit 50 further comprises an AND gate 96. This AND gate has a first input coupled to the comparator 92 via a switch 98, and a second input to the second RMMV 56. The first input of the AND gate 96 is additionally connected to the supply terminal 32 via another switch 100 and a resistor 102. The switches 98 and 100 are both actuated by the RMMV 54, with the switch 98 closed when the RMMV goes high, and with the other switch 100 closed when the RMMV goes low. Consequently, the power control pulse generator circuit 50 produces the duration modulated control pulses only when the two RMMVs 54 and 56 are both high.

The AND gate 96 of the power control pulse generator circuit 50 has its output connected to both AND gates 80 and 82 of the first stepper motor driver circuit 28, as well as to both AND gates 80' and 82' of the second driver circuit 30. The output of the second RMMV is additionally connected to both NAND gates 76 and 78 of the first driver circuit 28, as well as to both NAND gates 76' and 78' of the second driver circuit 30.

OPERATION

Let us assume that the host system 12 has just put out the series of stepping pulses as a (A) in FIG. 2 and, at the same time, the stepping direction signal commanding the travel of the transducer 18 radially inwardly of the magnetic disk 14. The RMMVs 52 and 54 will both go high at time $t_1$ in response to the first of the series of stepping pulses and both remain so until time $t_{11}$, as at (B) and (C) in FIG. 2. The power control pulse generator circuit 50 is therefore conditioned to put out the duration modulated power control pulses during this $t_1$-$t_{11}$ period.

The stepper motor control circuit 34 will respond to the stepping pulses and stepping direction signal by putting out the "plus A", "minus A", "plus B" and "minus B" control signals of FIG. 2(D) through (G) for two phase driving of the stepper motor 24. The states of these control signals are depicted at (D) through (G) in FIG. 2 in accordance with the conventional bipolar driving method for the stepper motor and so fall outside the scope of this invention.

Theoretically, the "minus A" and "minus B" control signals can be phase inversions of the "plus A" and "plus B" control signals, respectively. However, in order to prevent simultaneous conduction of the transistors 60 and 62, 60' and 62', 64 and 66, and 64' and 66', slight differences are provided between the transition times $t_1$, $t_2$, $t_5$, $t_6$, $t_9$ and $t_{10}$ of the "plus A" and "minus A" control signals and between the transition times $t_3$, $t_4$, $t_7$ and $t_8$ of the "plus B" and "minus B" control signals.

The "plus A" control signal and the output from the second RMMV 56 are both high during the $t_2$–$t_5$ time interval. Consequently, the first NAND gate 76 of the first stepper motor driver circuit 28 will go low thereby causing conduction through the first transistor 60 in order to permit the passage of power from the supply terminal 32 therethrough. The power control pulse generator circuit 50 is putting out as aforesaid the power control pulses during the $t_1$–$t_{11}$ time interval, for application to both AND gates 80 and 82 of the first driver circuit 28. However, since the "minus A" control signal is low during the $t_2$–$t_5$ time interval, the power control pulses will pass only through the first AND gate 80, on to the base of the fourth transistor 66 of the first driver circuit 28.

Thus, during the $t_2$–$t_5$ time interval, the first transistor 60 of the first driver circuit 28 is constantly on, the second 62 and third 64 transistors off, and the fourth transistor 66 on only during the durations of the duration modulated power control pulses. Accordingly, the first set of windings $W_1$ of the stepper motor 24 will be intermittently energized forwardly, as indicated by the rightward arrow in FIG. 3, through the circuit comprising the first transistor 60, windings $W_1$, fourth transistor 66, and ground. As desired, both first 60 and fourth 66 transistors might be turned on intermittently and synchronously, all that is required being that at least either of two related transistors conduct intermittently.

Figure 5:
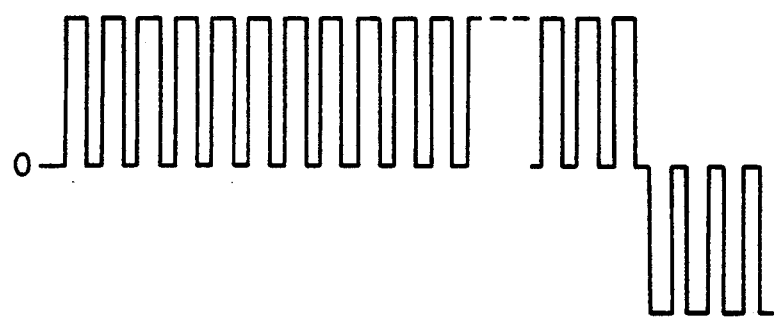
FIG. 5 is a waveform diagram of the supply voltage interrupted for application to the stepper motor in accordance with the invention.

FIG. 2 shows at (H) the supply voltage thus applied intermittently to the first set of stepper motor windings $W_1$. The intermittent supply voltage is indicated by a number of vertical lines here for the lack of sufficient space. FIG. 5 is a more accurate illustration of the intermittent supply voltage.

The "plus A" control signal is shown to be low, and the "minus A" control signal high, during the $t_6$–$t_9$ time interval at (D) and (E) in FIG. 2. The first transistor 60 of the first driver circuit 28 will become nonconductive as the first NAND gate 76 goes high. The fourth transistor 66 will also become nonconductive as the first AND gate 80 inhibits the passage of the power control pulses therethrough. Instead, the second NAND gate 78 will go low thereby causing conduction through the third transistor 64, and the second AND gate 82 will permit the passage of the power control pulses therethrough on to the base of the second transistor 62. Thus the first set of stepper motor windings $W_1$ will be energized reversely, as indicated at (H) in FIG. 2 and by the leftward arrow in FIG. 3, through the circuit comprising the third transistor 64, windings $W_1$, second transistor 62, and ground.

The second set of stepper motor windings $W_2$ are likewise energized by the second driver circuit 30. Namely, when the "plus B" control signal is high, as from time $t_4$ to time $t_7$ as at (F) in FIG. 2, the first transistor 68' of the second driver circuit 30 will conduct continuously, and the fourth transistor 66' will conduct intermittently. The second set of stepper motor windings $W_2$ will thus be forwardly energized intermittently, as at (I) in FIG. 2. Also, when the "minus B" control signal is high, as before time $t_3$ and after time $t_8$ as at (G) in FIG. 2, the third transistor 64' will conduct continuously, and the second transistor 62' will conduct intermittently. The second set of stepper motor windings $W_2$ will thus be reversely energized intermittently, as at (I) in FIG. 2.

As shown at (B) in FIG. 2, the first RMMV 54 will go low at time $t_{11}$ upon lapse of the predetermined period $T_2$ following the appearance of the last of the series of stepping pulses under consideration. Thereupon the switch 98 of the power control pulse generator circuit 50 will open whereas the other switch 102 will be closed. Since the second RMMV 56 remains high until the subsequent time $t_{12}$, the supply voltage will be applied continuously through the AND gate 96 to the two driver circuits 28 and 30 during the $t_{11}$–$t_{12}$ time interval.

Thus, as the transducer 18 starts reading data on the magnetic disk 14 at or shortly after the time $t_{11}$, the stepper motor 24 will be powered by the continuous supply voltage in order to preclude the possibility of noise production by the intermittent supply voltage. The stepper motor windings $W_1$ and $W_2$ will be both deenergized when the second RMMV 56 goes low at the time $t_{12}$.

As has been set forth with reference to FIG. 4, the duty ratio of the power control pulses from the generator circuit 50 will change in proportion with variations in the supply voltage. Such change in the duty ratio of the power control pulses will result in a corresponding change in the conducting periods of the transistors 62 and 66 of the first driver circuit 28 and of the transistors 62' and 66' of the second driver circuit 30. The fluctuations in the supply voltage will thus be compensated for, assuring the smooth rotation of the stepper motor 24 for correct track seek operation. Also, noise production and power loss will be reduced to a minimum as no unnecessarily high current will flow through the stepper motor windings $W_1$ and $W_2$.

SECOND FORM

Figure 6:
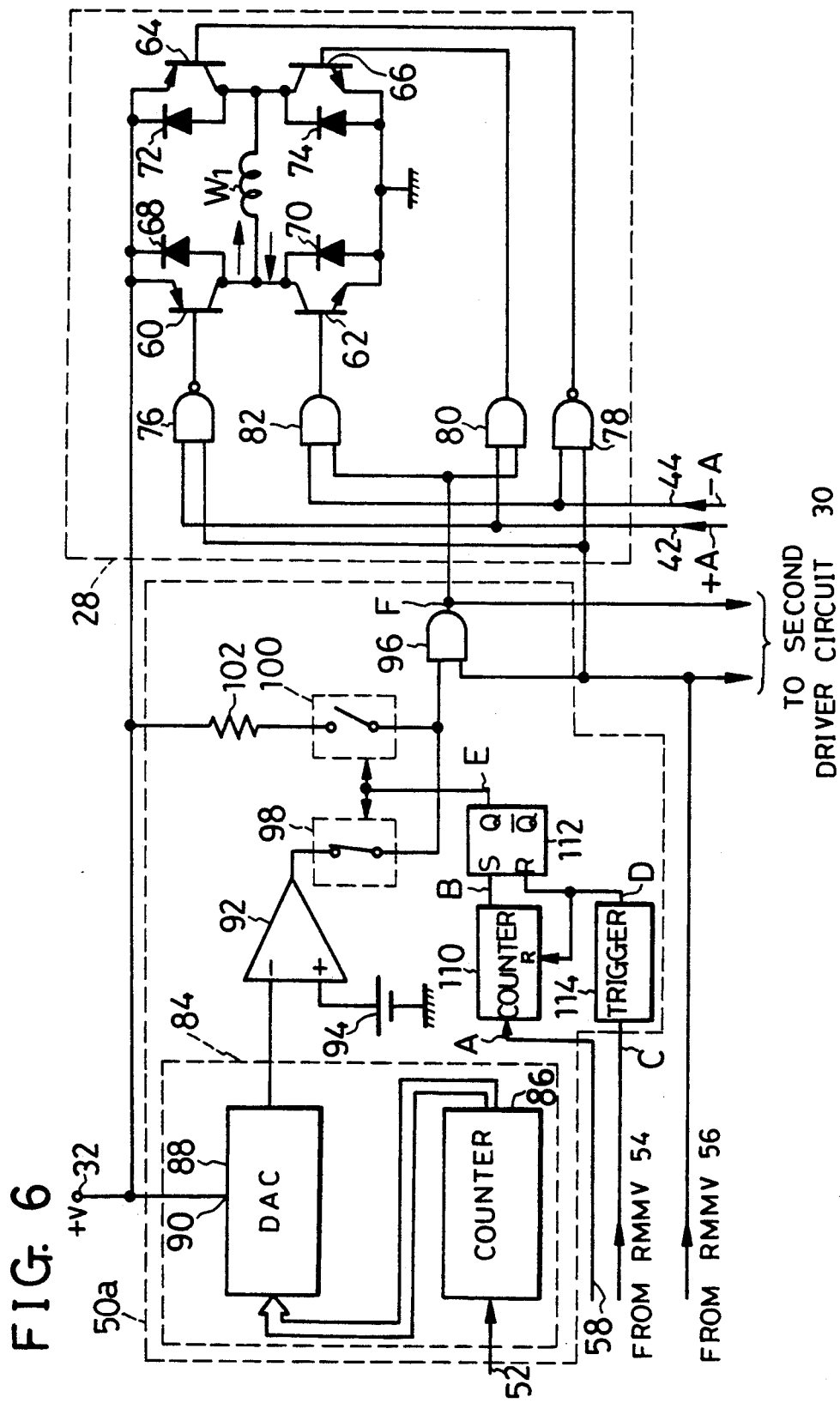
FIG. 6 is a diagram similar to FIG. 3 but showing another preferred embodiment of the invention.

FIG. 6 shows an alternate power control pulse generator circuit 50a for use in the FIG. 1 disk drive 10 in substitution for the FIG. 3 circuit 50. The alternate circuit 50a differs from the FIG. 3 circuit 50 in additionally comprising a counter 110, a flip flop 112 and a trigger circuit 114. The other parts of the circuit 50a are designated by the same reference numerals as used to denote their corresponding parts in the FIG. 3 circuit.

The counter 110 has an input coupled to the inverted stepping pulse line 58, FIG. 1, and an output coupled to the set input S of the flip flop 112, the output Q of which is connected to the control inputs of the switches 98 and 100. The trigger circuit 114 has an input coupled to the RMMV 54, FIG. 1, and an output coupled to both reset inputs R of the counter 110 and the flip flop 112.

Thus, in this alternate power control pulse generator circuit 50a, the switches 98 and 100 are actuated not directly by the RMMV 54 as in the FIG. 3 circuit 50 but by the flip flop 112. The flip flop 112 introduces a delay in the actuation of the switches 98 and 100 in order to assure a high starting torque for the stepper motor 24, as will become apparent from the following description of operation.

OPERATION OF SECOND FORM

Figure 7:
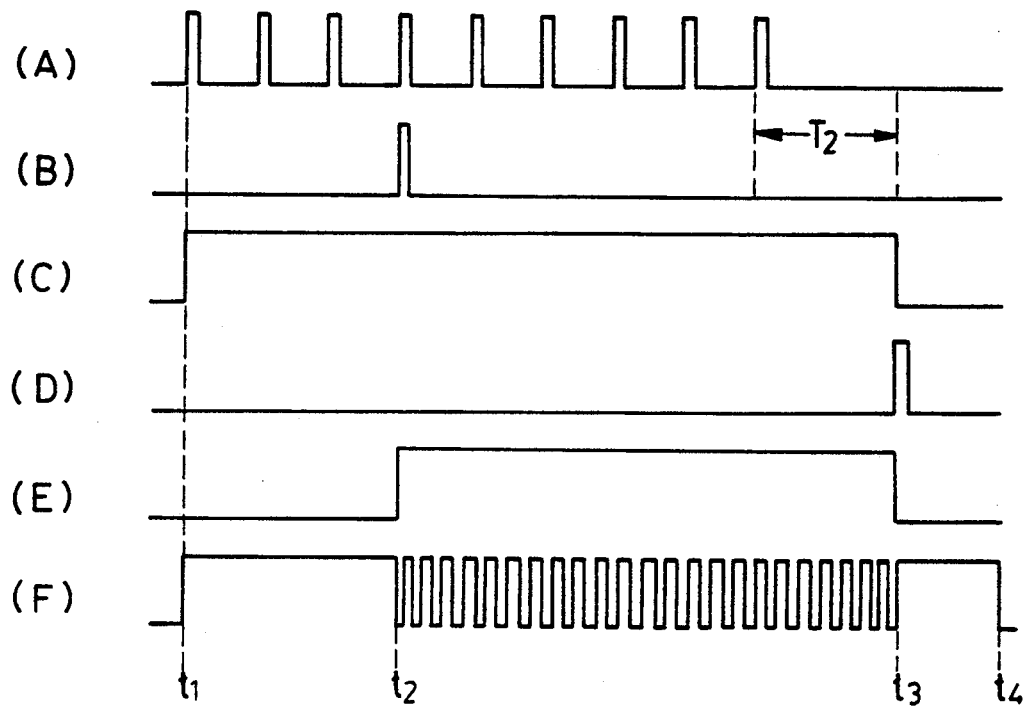
FIG. 7, consisting of (A) through (F), is a waveform diagram useful in explaining the operation of the FIG. 6 embodiment.

FIG. 7 is explanatory of the operation of the FIG. 6 power control pulse generator circuit 50a. The counter 110 puts out a trigger pulse each time it counts four clock pulses, as will be understood from (A) and (B) in FIG. 7, thereby setting the flip flop 112 as at (E) in FIG. 7. It will be noted that the flip flop 112 is reset not at time $t_1$ when the first of the FIG. 7(A) series of clock pulses appears but at later time $t_2$. The trigger circuit 114 puts out a trigger pulse, as at (D) in FIG. 7, when the RMMV 54 goes low at time $t_3$, as at (C) in FIG. 7. This trigger pulse is impressed to the reset inputs R of the counter 110 and the flip flop 112. Therefore, the flip flop 112 is high from time $t_2$ to time $t_3$.

The first switch 98 is closed when the flip flop 112 is high, and the second switch 100 is when the flip flop is low. Consequently, during the $t_1-t_2$ time interval, the continuous supply voltage is impressed to the AND gate 96 via the second switch 100, rather than the duration modulated power control pulses via the first switch 98.

It is understood that the second RMMV 56 is now high, as will be seen by referring back to (C) in FIG. 2. The resulting high output from the AND gate 96 during the $t_1-t_2$ time interval is impressed to both AND gates 80 and 82 of the first stepper motor driver circuit 28, as well as to both AND gates 80' and 82' of the second driver circuit 30. Thus neither of the transistors 62 and 66 of the first driver circuit 28, as well as of the transistors 62' and 66' of the second driver circuit 30, conducts intermittently but continuously. This state may be described that the duty ratio of the power control pulses is 100 percent. The supply voltage will therefore be applied continuously to the stepper motor windings $W_1$ and $W_2$ thereby enabling the stepper motor to start moving the transducer 18 toward a desired destination track with a sufficiently high starting torque.

Less torque suffices once the transducer has started moving. Accordingly, after the time $t_2$, the power control pulses will be impressed to the AND gate 96 via the first switch 98, thereby causing the stepper motor 24 to be powered intermittently and so saving power.

Of course, in some cases, the transducer will arrive at a destination track while the stepper motor is being powered continuously, as during the $t_1-t_2$ time interval in FIG. 7. The intermittent powering of the transducer according to this invention will then be unnecessary in this alternate embodiment.

Assume that the magnitude of the current flowing through the stepper motor windings $W_1$ and $W_2$ in the FIG. 6 circuitry during the $t_1-t_2$ period in FIG. 7 is the same as that in the FIG. 3 circuitry. Then power loss in the FIG. 6 circuitry is less than that in the FIG. 3 circuitry because the current magnitude during the $t_2-t_3$ period is less than that during the $t_1-t_2$ period. Assume, on the other hand, that the magnitude of the current flowing through the stepper motor windings $W_1$ and $W_2$ in the FIG. 6 circuitry during the $t_2-t_3$ period is the same as that in the FIG. 3 circuitry. Then the current flowing through the stepper motor windings in the FIG. 6 circuitry during the $t_1-t_2$ period is of sufficiently high magnitude to eliminate the likelihood of the transducer being not positioned on the desired destination track due to the lack of enough starting torque.

THIRD FORM

Figure 8:
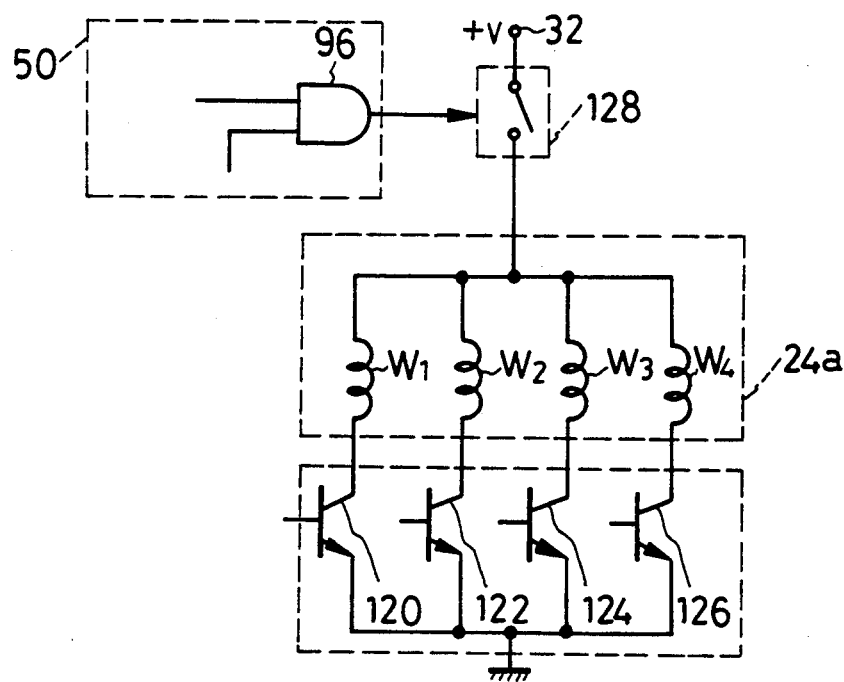
FIG. 8 is a partial schematic electrical diagram of still another preferred embodiment of the invention.

The present invention is applicable not only to the bipolar stepper motor 24, as in the FIGS. 3 and 6 embodiments, but also to a unipolar stepper motor 24a illustrated schematically in FIG. 8. Such a motor has sets of stator windings $W_1$, $W_2$, $W_3$ and $W_4$, with switching transistors 120, 122, 124 and 126 connected respectively in series therewith. The windings $W_1-W_4$ are to be excited unidirectionally for motor rotation in a direction.

FIG. 8 also shows a switch 128 connected between the supply terminal 32 and the stepper motor windings $W_1-W_4$. This switch is to be turned on and off by the duration modulated power control pulses from the generator circuit 50. The switching transistors 120-126 may then be held conductive throughout the periods when the associated windings are to be excited.

Alternatively, as in the FIGS. 3 and 6 embodiments, the transistors 120 and 126 may be turned on and off as dictated by the power control pulses from the generator circuit 50. The switch 128 is then unnecessary.

POSSIBLE MODIFICATIONS

Notwithstanding the foregoing detailed disclosure of some preferable embodiments of this invention, it is not desired that the invention be limited by the exact details of such disclosure. The following, then, is a brief list of possible modifications, alterations and adaptations of the illustrated embodiments which will suggest themselves to those skilled in the arts without departing from the scope of the invention as expressed in the appended claims:

1. The production and nonproduction of the power control pulses from the generator circuit 50 or 50a could be determined on the input side, rather than the output side as in the illustrated embodiments, of the comparator 92. For example, the magnitude of the reference voltage might be made variable between two values, one lower, and the other higher, than the peak value of the triangular wave $V_t$, FIG. 4. The comparator 92 would then produce a continuously high output when the reference voltage was switched to the higher value.

2. The connection of the supply terminal 32 to the DAC 88 for the provision of the amplitude modulated triangular wave as in the illustrated embodiments is preferred but is nevertheless one of many possible methods of producing the power control pulses having a duty ratio dependent upon the supply voltage. Another method is to constantly monitor the supply voltage and to modulate the amplitude of the triangular wave with a difference between the supply voltage and a second reference voltage. The amplitude modulated triangular wave thus obtained may then be applied to the comparator 92 for comparison with the first reference voltage.

3. Still another possible method of producing the power control pulses is to produce a triangular wave of constant amplitude from its generator circuit 84 and, instead, to modulate the magnitude of the reference voltage with the supply voltage.

4. Yet another possible method of producing the power control pulses is to monitor the magnitude of the current flowing through the stepper motor instead of monitoring the supply voltage.

5. The four switching transistors of each stepper motor driver circuit could be of the same conductivity type.

6. The power control pulses could be frequency modulated, instead of being duration modulated as in the illustrated embodiments. Frequency modulated pulses are constant in duration but varies in recurrence rate in inverse proportion to the supply voltage. However, duration modulated pulses and frequency modulated ones are alike in that both vary in duty ratio depending upon the supply voltage.

7. The teachings of FIG. 8 could be applied to the bipolar driving of the stepper motor as in the FIGS. 3 and 6 embodiments, by providing a switch between the supply terminal and the stepper motor for on off control by the power control pulses.

What is claimed is:

1. A data transfer apparatus for use with a rotating data storage disk, comprising:
   (a) a transducer for data transfer with a rotating data storage disk;
   (b) transducer positioning means including a stepper motor for positioning the transducer on the data storage disk;
   (c) supply means for supplying a unidirectional supply voltage, the supply voltage being susceptible to fluctuation;
   (d) a plurality of switching elements connected between the supply means and the stepper motor;
   (e) a stepper motor control circuit connected to the switching elements for applying thereto motor control signals in response to a series of stepping pulses in order to cause controlled excitation of the stepper motor from the supply means;
   (f) a power control pulse generator circuit connected to the supply means for generating a series of power control pulses having a duty ratio dependent upon the fluctuating supply voltage, the power control pulse generator circuit comprising:
      (i) triangular wave generator means for generating a triangular wave having an amplitude dependent upon the fluctuating supply voltage;
      (ii) a source of a reference voltage; and
      (iii) a comparator connected to both the triangular wave generator means and the reference voltage source for producing the power control pulses by comparing the triangular wave and the reference voltage; and
   (g) circuit means connected to the power control pulse generator circuit for interrupting the controlled excitation of the stepper motor as dictated by the power control pulses;
wherein the triangular wave generator means comprises:
   digital circuit means for generating digital data representative of a periodically varying quantity; and
   a digital to analog converter connected to the digital circuit means for translating the digital data into the triangular wave.

2. The data transfer apparatus of claim 1 wherein the digital to analog converter of the triangular wave generator means has a supply input connected to the supply means whereby the triangular wave produced by the converter has an amplitude dependent upon the supply voltage.

3. A data transfer apparatus for use with a rotating data storage disk, comprising:
   (a) a transducer for data transfer with a rotating data storage disk;
   (b) transducer positioning means including a stepper motor for positioning the transducer on the data storage disk;
   (c) supply means for supplying a unidirectional supply voltage, the supply voltage being susceptible to fluctuation;
   (d) a plurality of switching elements connected between the supply means and the stepper motor;
   (e) a stepper motor control circuit connected to the switching elements for applying thereto motor control signals in response to a series of stepping pulses in order to cause controlled excitation of the stepper motor from the supply means;
   (f) a power control pulse generator circuit connected to the supply means for generating a series of power control pulses having a duty ratio dependent upon the fluctuating supply voltage, the power control pulse generator circuit comprising:
      (i) triangular wave generator means for generating a triangular wave having an amplitude dependent upon the fluctuating supply voltage;
      (ii) a source of a reference voltage; and
      (iii) a comparator connected to both the triangular wave generator means and the reference voltage source for producing the power control pulses by comparing the triangular wave and the reference voltage; and
   (g) circuit means connected to the power control pulse generator circuit for interrupting the controlled excitation of the stepper motor as dictated by the power control pulses;
wherein the power control pulse generator circuit further comprises means for permitting the power control pulse generator circuit to put out the power control pulses only when the stepper motor needs excitation for repositioning the transducer on the data storage disk.

4. A data transfer apparatus for use with a rotating data storage disk, comprising:
   (a) a transducer for data transfer with a rotating data storage disk;
   (b) transducer positioning means including a stepper motor for positioning the transducer on the data storage disk;
   (c) supply means for supplying a unidirectional supply voltage, the supply voltage being susceptible to fluctuation;
   (d) a plurality of switching elements connected between the supply means and the stepper motor;
   (e) a stepper motor control circuit connected to the switching elements for applying thereto motor control signals in response to a series of stepping pulses in order to cause controlled excitation of the stepper motor from the supply means;
   (f) a power control pulse generator circuit connected to the supply means for generating a series of power control pulses having a duty ratio dependent upon the fluctuating supply voltage, the power control pulse generator circuit comprising:
      (i) triangular wave generator means for generating a triangular wave having an amplitude dependent upon the fluctuating supply voltage;
      (ii) a source of a reference voltage; and
      (iii) a comparator connected to both the triangular wave generator means and the reference voltage source for producing the power control pulses by comparing the triangular wave and the reference voltage; and (g) circuit means connected to the power control pulse generator circuit for interrupting the controlled excitation of the stepper motor as dictated by the power control pulses;

wherein the power control pulse generator circuit further comprises delay means for introducing a prescribed delay in the production of the power control pulses from the power control pulse generator circuit after the appearance of the first of each series of stepping pulses.

5. The data transfer apparatus of claim 4 wherein the delay means of the power control pulse generator circuit comprises:

(a) a counter for counting each series of stepping pulses up to a predetermined number; and (b) circuit means connected to the counter for permitting the production of the power control pulses when each series of stepping pulses are counted to the predetermined number.

wherein the power control pulse generator circuit further comprises delay means for introducing a prescribed delay in the production of the power control pulses from the power control pulse generator circuit after the appearance of the first of each series of stepping pulses.

6. A data transfer apparatus for use with a rotating data storage disk, comprising:

(a) a transducer for data transfer with a rotating data storage disk;

(b) transducer positioning means including a stepper motor for positioning the transducer on the data storage disk;

(c) supply means for supplying a unidirectional supply voltage, the supply voltage being susceptible to fluctuation;

(d) a plurality of switching elements connected between the supply means and the stepper motor;

(e) a stepper motor control circuit connected to the switching elements for applying thereto motor control signals in response to a series of stepping pulses in order to cause controlled excitation of the stepper motor from the supply means;

(f) a power control pulse generator circuit connected to the supply means for generating a series of power control pulses having a duty ratio dependent upon the fluctuating supply voltage, the power control pulse generator circuit comprising:

(i) triangular wave generator means for generating a triangular wave having an amplitude dependent upon the fluctuating supply voltage;

(ii) a source of a reference voltage; and (iii) a comparator connected to both the triangular wave generator means for the reference voltage source for producing the power control pulses by comparing the triangular wave and the reference voltage;

(g) circuit means connected to the power control pulse generator circuit for interrupting the controlled excitation of the stepper motor as dictated by the power control pulses;

wherein the circuit means comprises a switch connected between the power control pulse generator circuit and the stepper motor for on off control of the controlled excitation of the stepper motor in response to the power control pulses.

7. A rotating disk data transfer apparatus for use with a host system thereby to be powered, the host system supplying stepping pulses and clock pulses to the apparatus, the data transfer apparatus comprising:

(a) a transducer for data transfer with a rotating data storage disk;

(b) transducer positioning means including a stepper motor for positioning the transducer on the data storage disk;

(c) first input means for inputting from the host system a unidirectional supply voltage for powering the stepper motor and other loads so that the supply voltage is susceptible to fluctuations;

(d) a plurality of switching elements connected between the first input means and the stepper motor;

(e) second input means for inputting the stepping pulses from the host system;

(f) a stepper motor control circuit connected to the switching elements for applying thereto motor control signals in order to cause controlled excitation of the stepper motor from the first input means, the stepper motor control circuit being also connected to the second input means for producing the motor control signals in response to each series of stepping pulse supplied from the host system in order to cause the transducer to be positioned in another location on the data storage disk;

(g) third input means for inputting the clock pulses from the host system;

(h) a power control pulse generator circuit connected to the first and the third input means for generating a series of power control pulses derived from the clock pulses, the power control pulses having a duty ratio dependent upon the fluctuating supply voltage; and (i) circuit means connected to the power control pulse generator circuit for interrupting the controlled excitation of the stepper motor as dictated by the power control pulses.

8. The data transfer apparatus of claim 7 wherein the power control pulse generator circuit comprises:

(a) a digital counter connected to the third input means for repeatedly counting the clock pulses to a predetermined number and hence producing a periodically varying digital output;

(b) a digital to analog converter connected to the digital counter for translating the digital output into an equivalent analog triangular wave;

(c) a source of a reference voltage; and (d) a comparator connected to both the digital to analog converter and the reference voltage source for producing the power control pulses by comparing the triangular wave and the reference voltage.

9. The data transfer apparatus of claim 8 wherein the digital to analog converter of the power control pulse generator circuit has a supply input connected to the first input means whereby the triangular wave produced by the converter has an amplitude dependent upon the supply voltage.

10. A data transfer apparatus for use with a rotating data storage disk, comprising:

(a) a transfer for data transfer with the rotating data storage disk;

(b) transducer positioning means including a bipolar stepper motor for positioning the transducer on the data storage disk, the bipolar stepper motor comprising a first and a second set of windings;

(c) supply means for supplying a unidirectional supply voltage, the supply voltage being susceptible to fluctuations;

(d) a first driver circuit comprising a bridge circuit of four switching elements through which the first set of windings of the stepper motor are connected between the supply means and ground;

(e) a second driver circuit comprising a bridge circuit of four switching elements through which the second set of windings of the stepper motor are connected between the supply means and ground;

(f) a stepper motor control circuit for applying motor control signals to the first and the second driver circuits in response to series of stepping pulses in order to cause controlled excitation of the first and the second sets of windings of the stepper motor from the supply means;

(g) a power control pulse generator circuit connected to the supply means for generating a series of power control pulses having a duty ratio dependent upon the fluctuating supply voltage, and (h) logic circuit means having inputs connected to the stepper motor control circuit and to the power control pulse generator circuit and having outputs connected to the bridge circuits of the first and the second driver circuits for interrupting the controlled excitation of the first and the second sets of windings of the stepper motor as dictated by the power control pulses.

11. A data transfer apparatus for use with a rotating data storage disk, comprising:

(A) a transducer for data transfer with the rotating data storage disk;

(B) transducer positioning means including a bipolar stepper motor for positioning the transducer on the data storage disk, the bipolar stepper motor comprising:
 (a) a first set of windings; and
 (b) a second set of windings;

(C) supply means for supplying a unidirectional supply voltage, the supply voltage being susceptible to fluctuations;

(D) a first driver circuit comprising:
 (a) a first switching element connected between a first extremity of the first set of windings of the stepper motor and the supply means;
 (b) a second switching element connected between the first extremity of the first set of windings of the stepper per motor and ground;
 (c) a third switching element connected between a second extremity of the first set of windings of the stepper motor and the supply means; and
 (d) a fourth switching element connected between the second extremity of the first set of windings of the stepper motor and the ground;

(E) a second driver circuit comprising:
 (a) a first switching element connected between a first extremity of the second set of windings of the stepper motor and the supply means;
 (b) a second switching element connected between the first extremity of the second set of windings of the stepper motor and ground;
 (c) a third switching element connected between a second extremity of the second set of windings of the stepper motor and the supply means; and
 (d) a fourth switching element connected between the second extremity of the second set of windings of the stepper motor and the ground;

(F) a stepper motor control circuit for causing controlled excitation of the first and the second sets of windings of the stepper motor from the supply means in response to series of stepping pulses, the stepper motor control circuit having:
 (a) a first output for supplying a first motor control signal for causing the first set of windings of the stepper motor to be excited in a first direction;
 (b) a second output for supplying a second motor control signal for causing the first set of windings of the stepper motor to be excited in a second direction opposite to the first direction;
 (c) a third output for supplying a third motor control signal for causing the second set of windings of the stepper motor to be excited in the first direction; and
 (d) a fourth output for supplying a fourth motor control signal for causing the second set of windings of the stepper motor to be excited in the second direction;

(G) a power control pulse generator circuit connected to the supply means for generating a series of power control pulses having a duty ratio dependent upon the fluctuating supply voltage; and (H) logic circuit means for interrupting the controlled excitation of the first and the second sets of windings of the stepper motor as dictated by the power control pulses, the logic circuit means comprising:
 (a) first logic circuit having a first input connected to the second output of the stepper motor control circuit, a second input connected to the power control pulse generator circuit, and an output connected to the second switching element of the first driver circuit;
 (b) a second logic circuit having a first input connected to the first output of the stepper motor control, a second input connected to the power control pulse generator circuit, and an output connected to the fourth switching element of the first driver circuit;
 (c) a third logic circuit having a first input connected to the fourth output of the stepper motor control circuit, a second input connected to the power control pulse generator circuit, and an output connected to the second switching element of the second driver circuit; and
 (d) a fourth logic circuit having a first input connected to the third output of the stepper motor control circuit, a second input connected to the power control pulse generator circuit, and an output connected to the fourth switching element of the second driver circuit.

12. The data transfer apparatus of claim 11 further comprising:
 (a) a pulse source for generating a pulse which rises with the first of each series of stepping pulses and which falls upon lapse of a preassigned length of time after the last of each series of stepping pulses;
 (b) a fifth logic circuit having a first input connected to the first output of the stepper motor control circuit, a second input connected to the pulse source, and an output connected to the first switching element of the first driver circuit;
 (c) a sixth logic circuit having a first input connected to second output of the stepper motor control circuit, a second input connected to the pulse source, and an output connected to the third switching element of the first driver circuit;
 (d) a seventh logic circuit having a first input connected to the third output of the stepper motor control circuit, a second input connected to the pulse source, and an output connected to the first switching element of the second driver circuit; and
 (e) an eighth logic circuit having a first input connected to the forth output of the stepper motor control circuit, a second input connected to the pulse source, and an output connected to the third switching element of the second driver circuit.

* * * * *